United States Patent
Shyu (10) Patent No.: US 7,479,417 B2
(45) Date of Patent: Jan. 20, 2009

(54) METHOD FOR MANUFACTURING CONTACT STRUCTURE OF PIXEL ELECTRODE OF LIQUID CRYSTAL DISPLAY DEVICE

(75) Inventor: Wen-Yi Shyu, Tao Yuan Shien (TW)

(73) Assignee: Au Optronics, Hsin-chu (TW)

( * ) Notice: Subject to any disclaimer, the term of this patent is extended or adjusted under 35 U.S.C. 154(b) by 0 days.

(21) Appl. No.: 11/976,222

(22) Filed: Oct. 23, 2007

(65) Prior Publication Data

US 2008/0044935 A1 Feb. 21, 2008

Related U.S. Application Data

(62) Division of application No. 11/187,831, filed on Jul. 25, 2005.

(30) Foreign Application Priority Data

Dec. 14, 2004 (TW) ................ 93138702 A (51) Int. Cl.
*H01L 21/00* (2006.01)
*H01L 21/44* (2006.01)

(52) U.S. Cl. ................ 438/149; 438/30; 438/158; 438/390; 438/685; 257/E21.29; 257/E21.291; 257/E21.287; 257/E21.414; 257/E21.561; 257/E27.111; 257/E29.146; 257/E29.151; 257/E29.291

(58) Field of Classification Search ................ 438/30, 438/72, 149, 158, 240, 390, 685; 257/E21.29, 257/287, 291, 414, 561, E27.111, E29.146, 257/151
See application file for complete search history.

(56) References Cited

U.S. PATENT DOCUMENTS

| 6,960,484 | B2 * | 11/2005 | Yoo et al. | 438/30 |
| 7,335,538 | B2 * | 2/2008 | Chou et al. | 438/149 |
| 7,341,898 | B2 * | 3/2008 | Tanaka et al. | 438/158 |
| 7,351,600 | B2 * | 4/2008 | Yoo et al. | 438/30 |
| 2002/0187592 | A1 * | 12/2002 | Wong | 438/149 |

FOREIGN PATENT DOCUMENTS

| CN | 1470927 A | 1/2004 |
| CN | 1495851 A | 5/2004 |
| KR | 2001109681 A | * 12/2001 |

* cited by examiner

*Primary Examiner*—Michael S Lebentritt
(74) *Attorney, Agent, or Firm*—Bacon & Thomas PLLC (57) ABSTRACT

A method for manufacturing a pixel electrode contact structure of a thin-film transistors liquid crystal display is disclosed. First, a transparent substrate having a first insulating layer thereon is provided. Afterward, a first metal layer and a second metal layer are sequentially formed on the substrate and then be patterned by a halftone technology and an etching process, wherein the second metal layer is removed within the pixel electrode contact area. In the meantime, the drain lines of the thin-film transistor comprising the first metal layer and the second metal layer are formed. Next, a patterned passivation layer is formed on the substrate. Finally, a pixel electrode layer directly connecting the first metal layers within the pixel electrode contact structure is formed on the substrate. This invention provides the pixel electrode contact structure with low contact resistance and prevents the current leakage from the drain line to the storage capacitor.

9 Claims, 6 Drawing Sheets

METHOD FOR MANUFACTURING CONTACT STRUCTURE OF PIXEL ELECTRODE OF LIQUID CRYSTAL DISPLAY DEVICE

This application is a divisional application of pending U.S. application Ser. No. 11/187,831 filed Jul. 25, 2005.

BACKGROUND OF THE INVENTION

1. Field of the Invention

The present invention relates to a pixel electrode contact structure of a liquid crystal display device and, more particularly, to a pixel electrode contact structure of a thin film transistor (TFT) liquid crystal display device.

2. Description of Related Art

Currently, since the cost for photolithography in the process for manufacturing the liquid crystal display panel is very high, manufacturers do their best to reduce the number of the lithography cycles in the manufacturing process to minimize costs. So far, the average number of the photolithography cycle (or the number of the mask cycle) has been reduced to about 4 or 5. However, some disadvantages happen on the contact interface between the pixel electrode and the conductive lines for connecting the drain of the TFT on the substrate of the panel in the optimized manufacturing processes.

Figure 1:
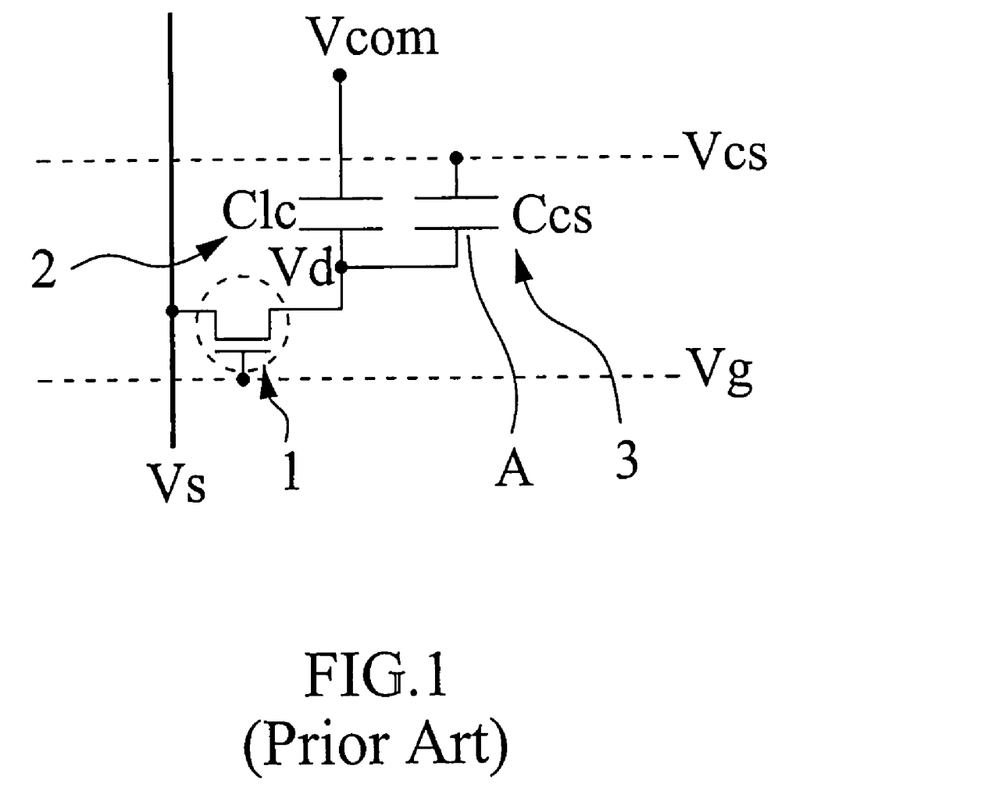
FIG. 1 is a schematic view of the equivalent circuit of a pixel area of a conventional liquid crystal display panel.

The equivalent circuit of a single pixel on the TFT LCD panel can be seen in FIG. 1. As shown in FIG. 1, the pixel includes elements such as a transistor 1, a pixel electrode 2, a storage capacitor 3, source lines Vs, scan lines Vg, and a common line Vcs. In most cases, the projection of the source lines on the panel intersects with that of the scan lines. The common lines are arranged parallel to the scan lines. The source, gate, and drain are electrically connected with the source lines, the scan lines, and the pixel electrode respectively. The drain is electrically connected with the storage capacitor, too. As the transistor 1 is turned on, the currents from the source lines can pass to the pixel electrode 2 for displaying and to the storage capacitor 3 for further storing. The charge stored in the capacitor 3 is released to supplement the charge on the pixel electrode 2 to retain the voltage as the transistor 1 is turned off. Hence, the possibility for dark spots or bright dots to occur can be reduced.

Figure 2A:
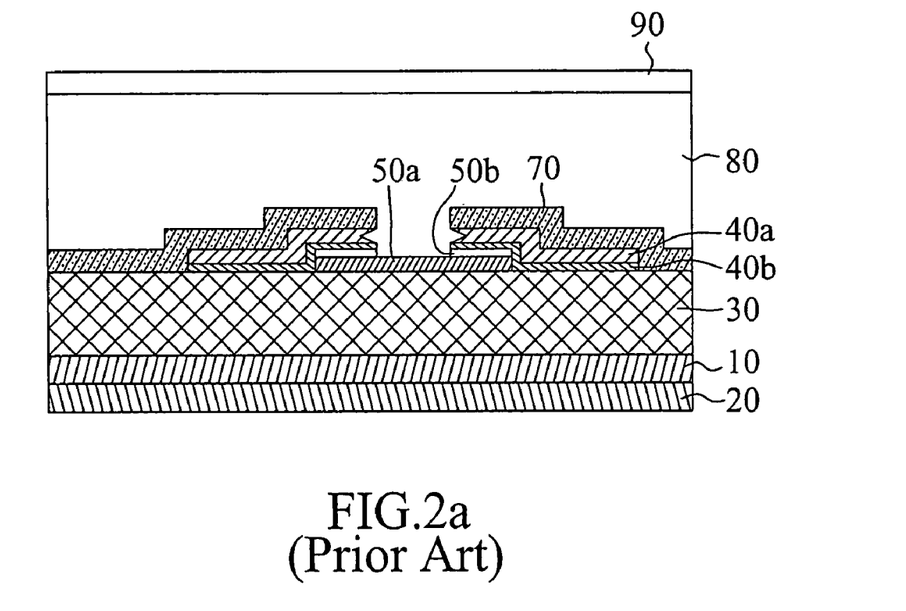
FIG. 2a is a cross section of a TFT area of a conventional TFT LCD.

However, owing to the conventional contact structure of the prior arts, some bright dots or some dark spots still occur. The conventional process for manufacturing the transistor area of a thin film transistor liquid crystal display device (TFT-LCD) panel can be seen in FIG. 2a. As shown in FIG. 2a, a gate metal 10 is formed on a glass substrate 20 first. Then, a gate insulating layer 30 is formed on the top of the gate metal 10. Subsequently, a patterned amorphous silicon layer 50a, and a patterned semi-conductive ohmic layer 50b are formed on the gate insulating layer 30. Finally, a patterned layer composed of a Ti layer 40b and an Al layer 40a is deposited on the semi-conductive ohmic layer 50b. In general, the Ti layer 40b is sandwiched between the Al layer 40a and the semi-conductive ohmic layer 50b. After the metal layers are formed, a second insulation layer 70 and an organic resin layer 80 are formed on the top for covering the layer illustrated above. Then a pixel electrode layer 90 such as ITO and optionally a passivation layer (not shown) are formed on the top of the organic resin layer 80.

Figure 2B:
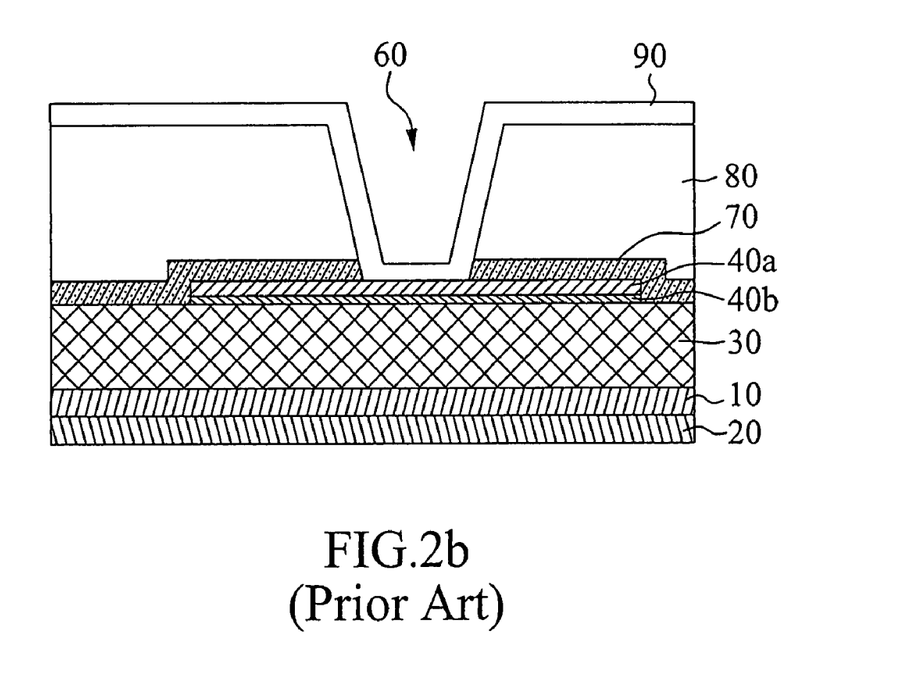
FIG. 2b is a cross section of a pixel electrode contact area of a conventional TFT LCD.

As the process for manufacturing the TFT is undergoing, the pixel electrode contact area is formed through similar process at the same time so as to minimize costs. The structure of the conventional pixel electrode contact area can be seen in FIG. 2b. As shown in FIG. 2b, the gate metal 10 formed on the glass substrate 20 is used as a bottom electrode of a capacitor (i.e. storage capacitor). However, the amorphous silicon 50a and the semi-conductive ohmic layer 50b in TFTs cannot be seen in the conventional pixel electrode contact area. In other words, the amorphous silicon and the semi-conductive ohmic layer are removed in the conventional pixel electrode contact area. Moreover, the pixel electrode 90 electrically connects the Al layer 40a through the via 60 located in the second insulation layer 70 and the organic resin layer 80. The Ti layer 40b and the Al layer 40a in this pixel electrode contact area function as a composite top electrode of a capacitor (i.e. storage capacitor) together. In fact, the composite top electrode of a capacitor is the same as or extended from the composite laminate of the drain in the transistor. However, in most of the cases, the materials of the pixel electrode such as ITOs are electrochemically active to the Al layer 40a. Hence, a reaction frequently occurs on the interface of the pixel electrode contact area. The product of this reaction results in a high electrical resist in the pixel electrode contact area, and further interferes with the driving of the motion of the liquid crystal molecules.

Figure 3A:
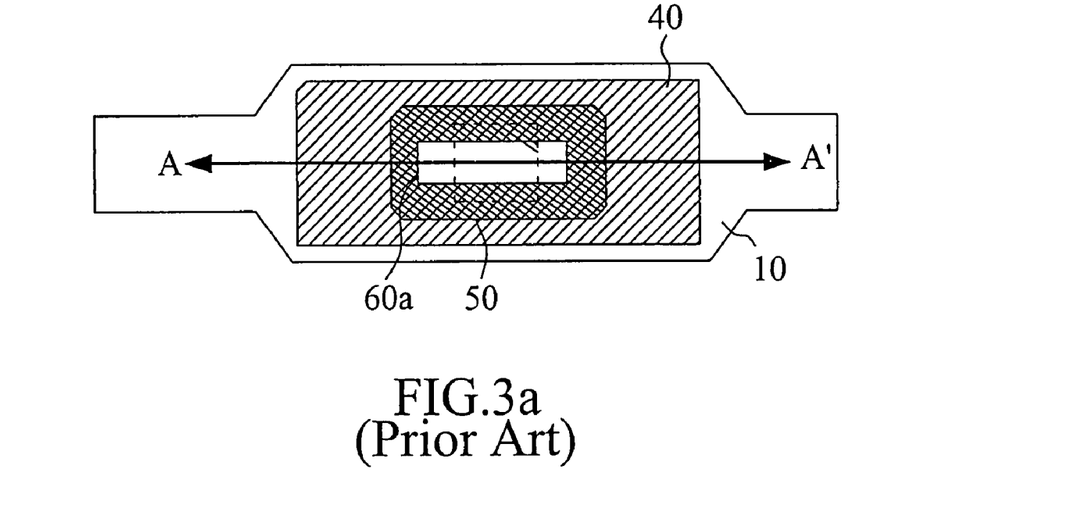
FIG. 3a is a top view of a pixel electrode contact area of a conventional TFT LCD.
Figure 3B:
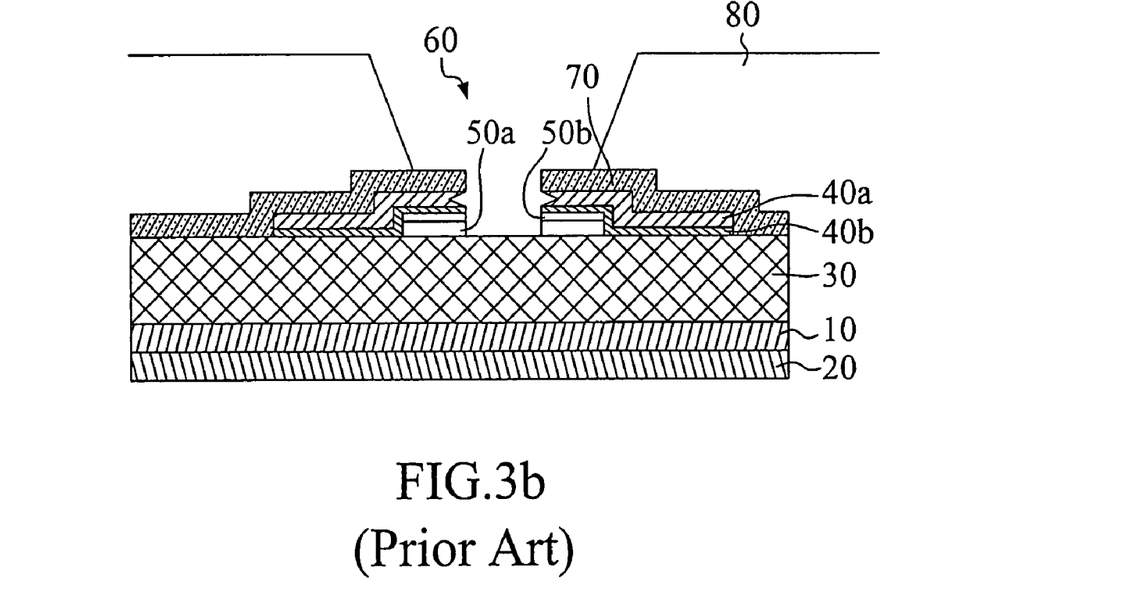
Figure 4:
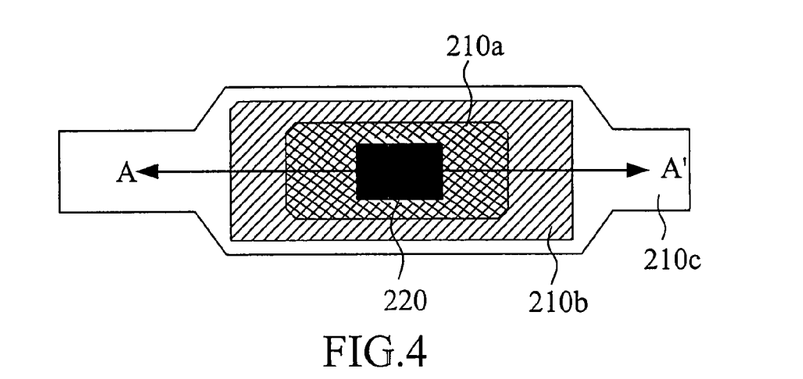
FIG. 4 is a top view of a pixel electrode contact structure of a TFT LCD of the present invention.

For improving the high electrical resist on the interface of the pixel electrode contact area, another contact structure is presented and made. The suggested contact structure can be seen in FIGS. 3a and 3b. FIG. 3b shows a cross section view of the line area marked as A-A' in FIG. 3a. The TFT of the liquid crystal display device of FIGS. 3a and 3b is the same as that illustrated in FIG. 2a. However, in the pixel electrode contact area, the patterned amorphous silicon layer 50a, and a patterned semi-conductive ohmic layer 50b are used as buffer layers for etching in via 60. The buffer layers are shown in the inside area circled by the dash line 60a in FIG. 3a. As the via 60 is formed, a part of the patterned amorphous silicon layer 50a and the patterned semi-conductive ohmic layer 50b in the pixel electrode contact area are removed by trough etching. Hence, the pixel electrode layer (ITO) will contact the gate insulating layer 30 directly. Moreover, the pixel electrode layer (ITO) also contacts the Ti layer 40b in the lateral part because of the undercut formed on the Al layer 40a by over etching.

As shown in FIG. 3a, as the patterned amorphous silicon layer 50a and the patterned semi-conductive ohmic layer 50b are formed on the gate insulating layer 30, the area inside the square 50 will keep a square-shaped patterned amorphous silicon layer 50a and a square-shaped patterned semi-conductive ohmic layer 50b. Then a patterned Ti layer 40a and a patterned Al layer 40b are formed in the area 40. Next, a second insulation layer 70 and an organic resin layer 80 are formed to cover the layers illustrated above. Finally, an etching for the area circled by the dash line 60a is performed to form via or a contact hole 60. In most of the etching steps for forming contact hole or via, over etching is frequently used for guaranteeing the exposure of the gate metal layer 10. But the over etching will also reduce the thickness of the gate insulating layer 30. Even with the existence of the aforesaid buffer layers (i.e. amorphous silicon layer 50a and semi-conductive ohmic layer 50b), some spikes or bumps still generate on the surface of the gate insulating layer 30, and a current leakage will occur to result in the deactivation or malfunction of the storage capacitor.

Therefore, it is desirable to provide an improved method to mitigate the aforementioned problems.

SUMMARY OF THE INVENTION

A method for manufacturing a contact structure of a pixel electrode of a liquid crystal display device is provided here. The method of the present invention can reduce the high electrical resist in the pixel electrode contact area between the pixel electrode and the conductive lines from the drain of a TFT of a liquid crystal display device without increasing the number of the mask cycles or the photolithography cycles. The method can also reduce the current leakage in the pixel electrode contact area between the pixel electrode and the conductive lines from the drain of a TFT of a liquid crystal display device without changing the materials of the TFT and the laminate on the LCD substrate. The actual capacitance of the storage capacitor can be also increased since less current leakage occurs. Moreover, the number of the dark dots or the bright dots can be effectively reduced.

A contact structure of a pixel electrode of a thin film transistor liquid crystal display device is also provided for improving the disadvantages illustrated above.

The method for manufacturing a contact structure of a pixel electrode of a liquid crystal display device of the present invention, includes the following steps: (a) providing a transparent substrate having a first insulation layer thereon; (b) forming a first metal layer and a second metal layer on the first insulation layer, wherein the first metal layer is located between the second metal layer and the first insulation layer; (c) forming a patterned photoresist layer on the second metal layer through halftone, and then removing the second metal layer on the first metal layer of a predetermined pixel electrode contact area through etching; (d) forming a patterned second insulation layer on the second metal layer; and (e) forming a transparent pixel electrode on the second insulation layer, wherein the transparent pixel electrode is electrically connected with the first metal layer in the pixel electrode contact area.

The pixel electrode contact structure of a thin film transistor liquid crystal display device of the present invention, includes: a transparent substrate having a third metal layer thereon; a first insulation layer formed on the third metal layer or on the transparent substrate; a patterned metal line having at least a first metal layer, a second metal layer with an opening, wherein the first metal layer is located between the second metal layer and the first insulation layer, the first metal layer is exposed in the opening of the second metal layer, and the opening of the second metal layer is located above part of the third metal layer where the second metal layer overlaps or intersects the third metal layer; a passivation layer having an Si-containing second insulation layer, an organic resin layer and a contact hole, wherein the second insulation layer is located between the first metal layer and the organic resin layer, the second insulation layer covers the first metal layer and the second metal layer outside the contact hole, and the first metal is exposed in the contact hole; and a transparent pixel electrode located on the passivation layer, wherein the transparent pixel electrode in the contact hole is electrically connected with the first metal layer exposed in the contact hole or the first metal layer exposed in the opening on the second metal layer.

The method of the present invention can optionally further include step (d1) forming an organic resin layer on the second insulation layer after step (d) for better protection. The substrate of the method of the present invention can optionally further include a third metal layer sandwiched between the transparent substrate and the first insulation layer for the facility of processing. It is preferred to use a substrate having or coated with a first insulation layer, and a patterned third metal layer, wherein the third metal layer is located between the first insulation layer and the surface of the transparent substrate. More preferably, the gate metal layer of the TFT is made of the same metal as that of the third metal layer. The first metal layer or the second metal layer in step (b) can be any conductive line on the panel. Preferably, the first metal layer or the second metal layer in step (b) is the conductive line electrically connected to the source or the drain of a thin film transistor. In addition, the conductive lines connecting the drain (or the source) of a thin film transistor can be made of at least a first metal layer and a second metal layer. Preferably, they are made of the first metal layer and the second metal layer. The materials of the first metal layer and the second metal layer can be any conventional electrically conductive materials. Preferably, the first metal layer and the second metal layer are Ti and Al, respectively. The transparent electrode of the liquid crystal display device can be made of any transparent conductive material. Preferably, the transparent electrode is ITO or IZO. The photoresist used for forming the opening of the second metal layer in the step (c) of the method of the present invention can have more than three portions with different thickness. Preferably, the photoresist after halftone and used in the present invention has first thickness, second thickness, and third thickness. Among them, the first thickness is the thickness of the photoresist located in the pixel electrode contact area, the second thickness is the thickness of the photoresist located over the conductive lines electrically connected with the drain or the source of thin film transistors. In addition, the second thickness is greater than the first thickness, and the third thickness is less than the first thickness.

The mask of the halftone of the method of the present invention can be made of different materials of different transparencies. Preferably, the mask has three kinds of transparencies: full transparency, semi-transparency, and non-transparency. The photoresist of the present invention can be any conventional photoresist. Preferably, the photoresist is positive photoresist. Furthermore, for increasing the functions of the pixel electrode contact structure of the present invention, the pixel electrode contact structure can optionally include an organic resin layer formed between the second insulation layer and the transparent pixel electrode.

The etching for removing the first metal layer or the second metal layer in the pixel electrode contact area can be any conventional etching for removing photoresist. Preferably, the removing of the second metal layer is achieved by dry etching, the removing of the first metal layer is achieved by wet etching.

Other objects, advantages, and novel features of the invention will become more apparent from the following detailed description when taken in conjunction with the accompanying drawings.

BRIEF DESCRIPTION OF THE DRAWINGS

FIG. 3b is a cross section view of a pixel electrode contact structure of a conventional TFT LCD in FIG. 3a.

DETAILED DESCRIPTION OF THE PREFERRED EMBODIMENT

Figure 5A:
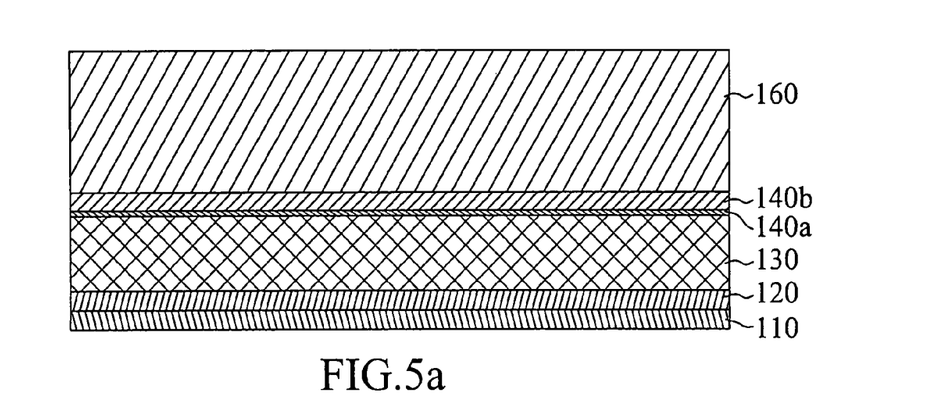
FIG. 5 is a schematic view of the method for manufacturing the pixel electrode contact structure of a TFT LCD of the present invention.

The method for manufacturing a pixel electrode contact can be seen by referring to FIG. 4, and FIGS. 5a to 5f. As shown in the figures mentioned above, a transparent substrate 110 having a patterned third metal layer 120 and a first insulation layer 130 thereon is provided first in the method of the present invention. The third metal layer 120 is located between the first insulation layer 130 and the transparent substrate 110. Actually, the third metal layer 120 is the gate of a thin film transistor (TFT) or a conductive line connecting with a TFT on the transparent substrate 110. The gate insulating layer of the TFT is made of the first insulation layer 130. Then an amorphous silicon layer and an semi-conductive ohmic layer are formed over the first insulation layer 130. For example, the channel portion, source, or drain can be formed by halftone and etching after the amorphous silicon layer and the semi-conductive ohmic layer are formed over the first insulation layer 130. In the pixel electrode contact area for electrically connecting the pixel electrode and the drain (or source), the amorphous Si layer and the semi-conductive ohmic layer are totally removed. Therefore, neither the semi-conductive ohmic layer nor the amorphous Si layer can be found in FIGS. 5a to 5f. After the deposition of the semi-conductive ohmic layer and the amorphous Si layer is achieved, Ti layer 140a and Al layer 140b are deposited on the first insulation layer 130 sequentially. Then photoresist layer 160 is formed on the surface of the Al layer 140b as shown in FIG. 5a.

Figure 5B:
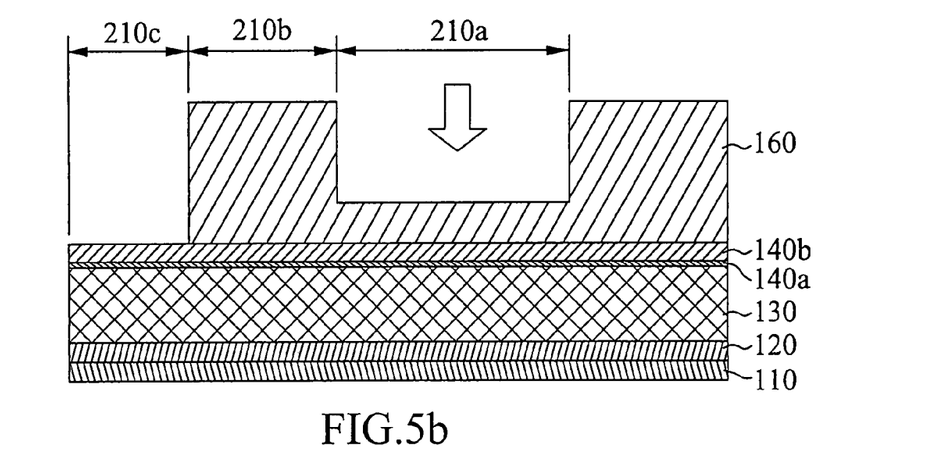
Figure 5C:
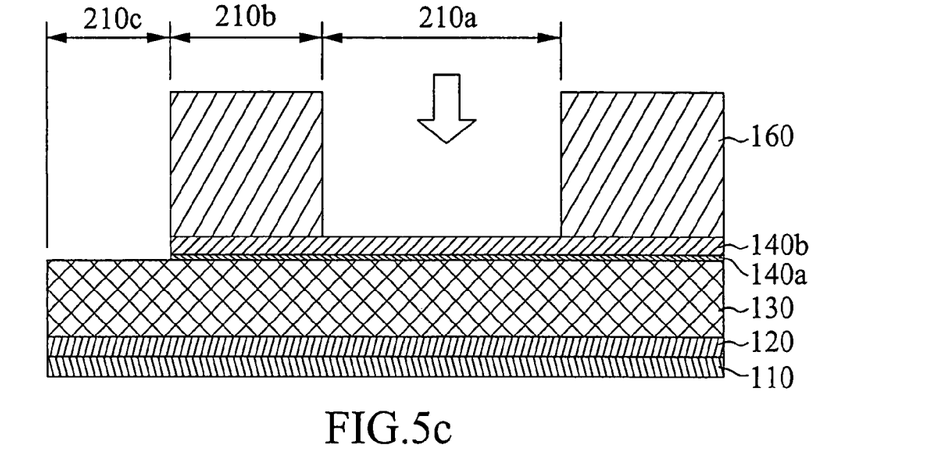
Figure 5D:
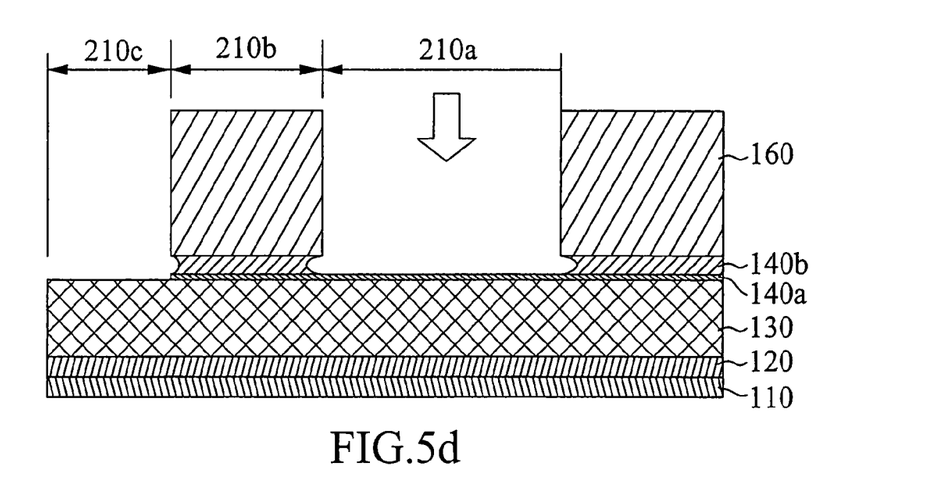

The photoresist layer 160 is then patterned by halftone. The mask used in the halftone has three portions with different transparencies, respectively. The first portion of the mask is made of semi-transparent material. The second portion of the mask is made of non-transparent material. The third portion of the mask is made of transparent material. The photoresist can be any conventional photoresist. Preferably, the photoresist is positive photoresist. In addition, the transparency of the first portion of the mask is preferred to be around 30%. The second portion of the mask is preferred to be the material of 0% transparency. Moreover, the transparency of the third portion of the mask is preferred to be 100%. After the halftone is achieved, the photoresist layer 160 has three portions with different thicknesses. In other words, they are first portion 210a with first thickness, a second portion 210b with second thickness, and a third portion 210c with third thickness in the photoresist layer 160, as shown in FIG. 5b. The pixel electrode contact will be formed in the first portion 210a of FIG. 5b or the square area 220 of FIG. 4. Moreover, the conductive lines electrically connected with the drain (or the source) of the TFT will be located in the second portion 210b of FIG. 5b.

The Al layer 140b in the third portion 210c is removed by wet etching. Then the Ti layer 140a in third portion 210c and the photoresist 160 in the first portion 210a are removed through dry etching at the same time (referring to FIG. 5c). The Al layer 140b in the first portion 210a is then removed by second wet etching and the Al layer 140b and the Ti layer 140a are thus patterned (referring to FIG. 5d). However, the Al layer 140b in the predetermined pixel electrode contact area is removed while the Ti layer 140a is retained in the pixel electrode contact area. Because the drain (or source) of the TFT and the conductive lines thereof are located in the second portion 210b, the drain (or source) of the TFT and their conductive lines all include the Al layer 140b and the Ti layer 140a.

Figure 5E:
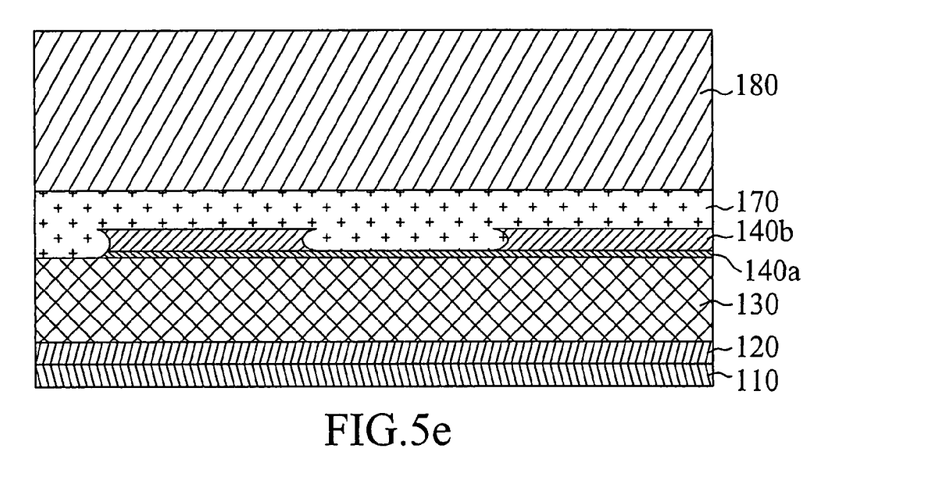
Figure 5F:
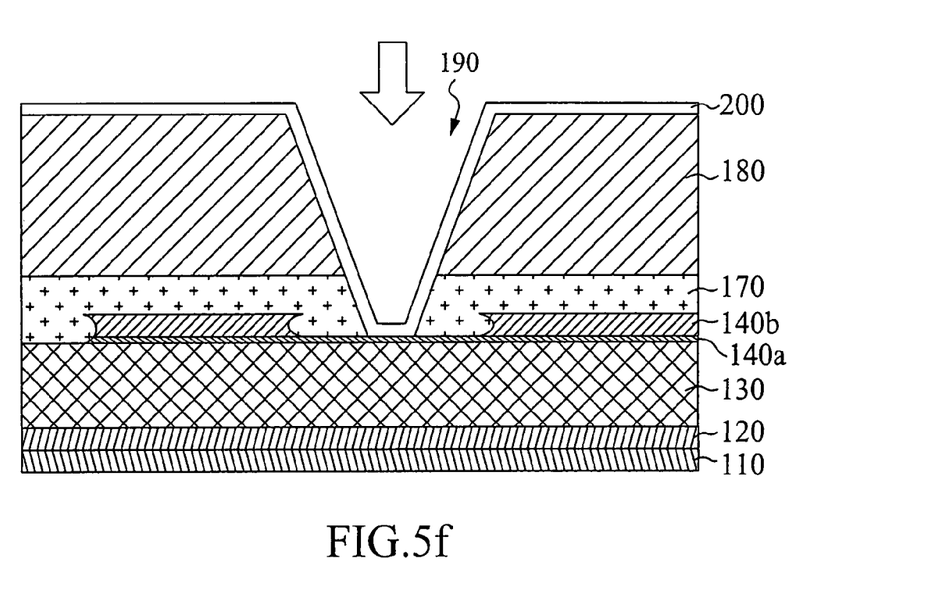

After the Ti layer 140a is patterned, a second insulation layer 170 and an organic resin layer 180 are formed over the surface of the Ti layer 140a sequentially (referring to FIG. 5e). Then another photoresist layer (not shown) with a patterned opening is formed on the top of the organic resin layer 180 and the pixel electrode contact area is defined by the patterned opening thereof (the area inside the square 220 in FIG. 4). The organic resin layer 180 and the second insulation layer 170 are then etched to form a contact window 190 to expose the Ti layer 140a. Then transparent pixel electrode layer 200 such as ITO is formed on the top of the organic resin layer 180. The transparent pixel electrode (ITO) layer 200 contacts with the Ti layer 140a through the contact window 190 (referring to FIG. 5f).

The method for manufacturing a contact structure of a pixel electrode of a liquid crystal display device utilizes the Ti layer and the Al layer as the composite conductive lines for electrically connecting drain (or source) of the TFT. Due to the high electrical conductivity of the Al layer, the width of the conductive lines can be effectively reduced and the aperture ratio of the pixel can then be increased. Furthermore, comparing to the high electrical resist in the contact structure of the prior arts (between the ITO and the Al layer), the electrical resist of the contact structure is effectively reduced by using the interface between Ti layer and ITO for conducting electrical currents in the pixel electrode contact area in the method of the present invention. Therefore, the electrical resist of the interface between the pixel electrode and the conductive lines can be reduced without changing the sequence of the laminate structure of the panel of the liquid crystal display device. In other words, the high electrical resist caused at the interface in the prior arts can now be improved without high cost and be easily achieved. In addition, compared with the contact structure with the buffer layer of the prior arts, the contact area (between the drain and the conductive lines connecting to the drain) of the present invention is large.

On the other hand, compared with the contact structure having a buffer interface between an amorphous silicon and a semi-conductive ohmic area of the prior arts, the contact structure of the pixel electrode of the present invention has no leaking current. Furthermore, since the buffer interface is saved from the contact structure of the present invention, the leakage of currents from the storage capacitor is avoided, the capacitance of the capacitor increases, and the yield for producing the liquid crystal display panel can be effectively increased.

Although the present invention has been explained in relation to its preferred embodiment, it is to be understood that many other possible modifications and variations can be made without departing from the spirit and scope of the invention as hereinafter claimed.

What is claimed is:

1. A method for manufacturing a contact structure of a pixel electrode of a liquid crystal display device, comprising the steps of:
   (a) providing a transparent substrate having a first insulation layer thereon;
   (b) forming a first metal layer and a second metal layer on the first insulation layer, wherein the first metal layer is located between the second metal layer and the first insulation layer;
   (c) forming a patterned photoresist layer on the second metal layer through halftone, and then removing the second metal layer on the first metal layer of a predetermined pixel electrode contact area through etching;
   (d) forming a patterned second insulation layer on the second metal layer; and
   (e) forming a transparent pixel electrode on the second insulation layer, wherein the transparent pixel electrode is electrically connected with the first metal layer in the pixel electrode contact area.

2. The method as claimed in claim 1, further comprising forming a patterned third metal layer on the transparent substrate, wherein the patterned third metal layer is located between the first insulation layer and the transparent substrate.

3. The method as claimed in claim 1, wherein the first metal layer or the second metal layer in step (b) is the conductive line electrically connected to the source or the drain of a thin film transistor.

4. The method as claimed in claim 1, wherein the first metal layer is Ti.

5. The method as claimed in claim 1, wherein the second metal layer is Al.

6. The method as claimed in claim 1, wherein the photoresist in step (C) has first thickness, second thickness, and third thickness, the first thickness is the thickness of the photoresist located in the pixel electrode contact area, the second thickness is the thickness of the photoresist located over the conductive lines electrically connected with the drain or the source of thin film transistors, the second thickness is greater than the first thickness, and the third thickness is less than the first thickness.

7. The method as claimed in claim 6, wherein the patterned photoresist layer is formed by using a mask having first portions, second portions, and third portions, the transparencies of the first portions, the second portions, and the third portions are different, and the transparency of the first portions ranges between the transparency of the second portions and the transparency of the third portion.

8. The method as claimed in claim 7, wherein the photoresist is a positive photoresist, the first portions are made of semi-transparent materials, the second portions are made of non-transparent materials, and the third portions are made of transparent materials.

9. The method as claimed in claim 1, further comprising step (d1) forming an organic resin layer on the second insulation layer after step (d).

* * * * *